(12) United States Patent
Sek

(10) Patent No.: US 8,218,936 B2
(45) Date of Patent: Jul. 10, 2012

(54) DEVICE FOR RECEIVING A SUBASSEMBLY ASSIGNED TO AN OPTICAL FIBER CABLE AND FOR FASTENING THE SAME TO A MOUNTING

(75) Inventor: Grzegorz Sek, Lodz (PL)

(73) Assignee: CCS Technology, Inc., Wilmington, DE (US)

( * ) Notice: Subject to any disclaimer, the term of this patent is extended or adjusted under 35 U.S.C. 154(b) by 335 days.

(21) Appl. No.: 12/541,637

(22) Filed: Aug. 14, 2009

(65) Prior Publication Data
US 2010/0040338 A1 Feb. 18, 2010

(30) Foreign Application Priority Data
Aug. 14, 2008 (EP) .................................... 08014476

(51) Int. Cl.
*G02B 6/00* (2006.01)
(52) U.S. Cl. ........................................ 385/136; 385/137
(58) Field of Classification Search .................. 385/136, 385/137
See application file for complete search history.

(56) References Cited

U.S. PATENT DOCUMENTS

| 7,756,381 | B2 * | 7/2010 | Bleus et al. | 385/136 |
| 2002/0150372 | A1 * | 10/2002 | Schray | 385/135 |
| 2007/0047897 | A1 * | 3/2007 | Cooke et al. | 385/136 |

* cited by examiner

*Primary Examiner* — Ryan Lepisto
(74) *Attorney, Agent, or Firm* — John H. Vynalek

(57) ABSTRACT

A device for receiving a fiber optic cable subassembly and fastening the subassembly to a mounting is disclosed. The device comprises a body having a front end, a rear end, a topside, and an underside. A rear anchor is formed on the underside at the rear end and is adapted to be introduced in a recess of the mounting. A u-shaped stop is formed on the underside at the front end. The u-shaped stop has a closed portion and a front anchor formed therein. The u-shape stop is adapted to be introduced in a recess of the mounting for fastening the subassembly received on the device to the mounting. When the u-shape stop is introduced in the recess of the mounting, the u-shaped stop deforms resulting in the body arching and thereby clamping the front anchor and the rear anchor in the recesses of the mounting.

20 Claims, 4 Drawing Sheets

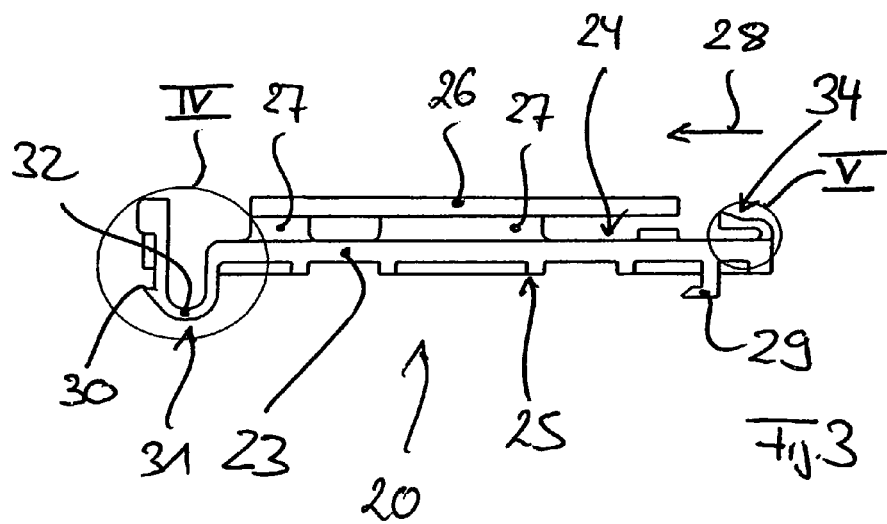
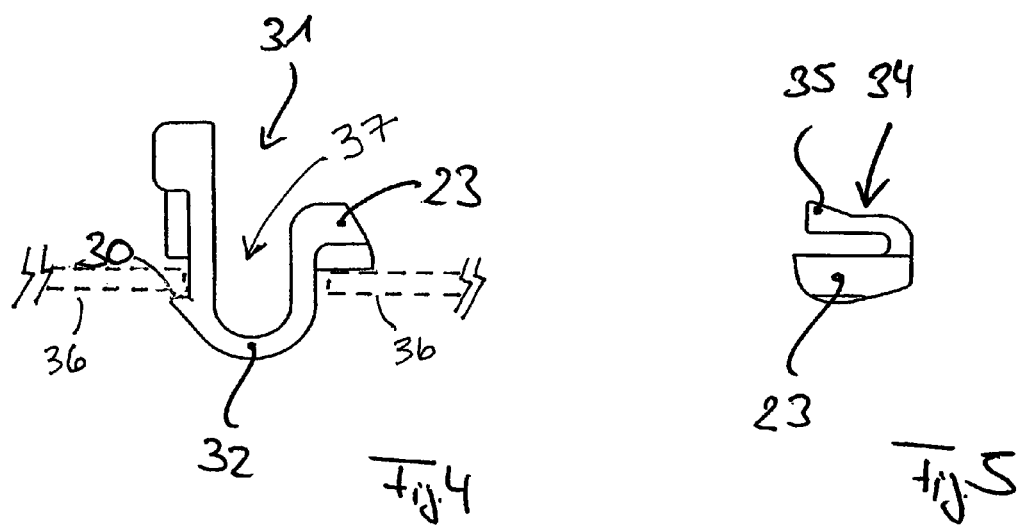

DEVICE FOR RECEIVING A SUBASSEMBLY ASSIGNED TO AN OPTICAL FIBER CABLE AND FOR FASTENING THE SAME TO A MOUNTING

CROSS-REFERENCE TO RELATED APPLICATIONS

This application claims benefit under 35 U.S.C. §119 of European Patent Application No. 08 014 476.9 filed Aug. 14, 2008.

BACKGROUND

1. Field of the Disclosure

The technology of the disclosure relates to a device for receiving a subassembly assigned to an optical fiber cable and for fastening the subassembly to a mounting via the device.

2. Technical Background

FIG. 1 shows a device, known in the prior art, for receiving a subassembly, in particular a furcation adaptor, assigned to an optical fibre cable and for fastening the subassembly to a mounting, particularly to a wall of a distribution panel or distribution cabinet, via the device. The device 10, shown in a side view in FIG. 1, has a bar-shaped basic body 11 with a topside 12 and with an underside 13. On the topside 12 of the basic body 11, a guide rail 14 is formed, which extends approximately parallel to the bar-shaped basic body 11. To receive the subassembly, the subassembly can be pushed on to the guide rail 14. When the subassembly is pushed onto the guide rail 14, the guide rail 14 engages into a groove formed on the subassembly. The subassembly is pushed onto the guide rail 14 in the direction of the arrow 15 shown in FIG. 1. The arrow 15 therefore indicates the direction in which a subassembly to be received by the device 10 is pushed onto the guide rail 14.

Anchoring elements 16 and 17 are formed on the underside 13 of the bar-shaped basic body 11 in the region of mutually opposite ends of the basic body 11. Thus, at the rear end of the basic body 11, as seen in the push-on direction 15, the anchoring element 16 is formed on the underside 13, and, at the front end of the bar-shaped basic body 11, as seen in the push-on direction 15, the anchoring element 17 is formed. The device 10 via the two anchoring elements 16, 17, being able to be introduced into recesses of a mounting, to which the device 10, together with the subassembly received by it and the optical fiber cable, is to be fastened. According to FIG. 1, in this case, the anchoring element 17 positioned at the front end, as seen in the push-on direction 15, of the bar-shaped basic body 11 is designed as an integral part of a stop 18 of U-shaped cross section. The stop 18, in the push-on direction 15, forming a stop for a subassembly to be pushed onto the guide rail 14.

The device 10, as illustrated in FIG. 1, has the disadvantage that, when it is fastened via its anchoring elements 16, 17 to a mounting, for example a wall of a distribution panel or distribution cabinet, and a force is exerted on the stop 18 of U-shaped cross section via the optical fibre cable or the subassembly received by the device 10, the anchoring elements 16, 17 may come loose from the mounting, by jumping out of the recesses of the mounting into which they are introduced. In this case, a secure fastening of the device 10 to the mounting is no longer ensured. This is a disadvantage. Therefore, there is a need for a device that does not come loose unintentionally from a mounting.

SUMMARY

In one aspect, there is provided a device for receiving a fiber optic cable subassembly and fastening the subassembly to a mounting. The subassembly may be a plug, a socket and/or a furcation adapter. The device comprises a body having a front end, a rear end, a topside, and an underside. A rear anchor is formed on and/or projects from the underside at the rear end and is adapted to be introduced in a recess of the mounting. A u-shaped stop is formed on the underside at the front end. The u-shaped stop has a closed portion and a front anchor formed therein. When the device is fastened to the mounting, the closed portion of the u-shaped stop can be introduced into a recess of the mounting. When the u-shaped stop is introduced into the recess of the mounting, and a force is exerted in the push-on direction on the u-shaped stop via the optical fiber cable or the subassembly, the u-shaped stop deforms resulting in the body arching and, thereby, clamping the front anchor and the rear anchor in the recesses of the mounting.

A guide rail is formed on the topside. The guide rail receives the subassembly by pushing the subassembly onto the guide rail in a push-on direction. The push-on direction is from the rear end towards the front end. An elastically deformable stop is formed at the rear end. The elastically deformable stop acts opposite to the push-on direction to prevent the subassembly from being inadvertently removed from the guide rail. The elastically deformable stop comprises a ramp shaped projection. The ramp shaped projection is pressed under a contour of the subassembly to not obstruct the subassembly when the subassembly is pushed onto the guide rail and removed from the guide rail. The ramp shaped projection automatically returns to a position partially covering the contour of the subassembly pushed onto the guide rail to prevent the subassembly from being inadvertently removed from the guide rail.

BRIEF DESCRIPTION OF THE FIGURES

FIG. 3 is a side view of the device shown in FIG. 2;

FIG. 4 is a detail view showing detail IV of FIG. 3;

FIG. 5 is a detail view showing detail V of FIG. 3;

DETAILED DESCRIPTION

Reference will now be made in detail to the preferred embodiments, examples of which are illustrated in the accompanying drawings, in which some, but not all embodiments are shown. Indeed, the disclosure should not be construed as limited to the embodiments set forth herein; rather, these embodiments are provided so that this disclosure will satisfy applicable legal requirements. Whenever possible, like reference numbers will be used to refer to like components or parts.

In the device for receiving a subassembly for a fiber optic cable has a basic body with a topside, an underside and a U-shaped stop. The U-shaped stop is designed in such a way that on the underside of the basic body a closed portion of the U-shaped stop projects with respect to the latter, in such a way that, when the subassembly received on the device is fastened to the mounting, the closed portion of the U-shaped stop can be introduced into a recess of the mounting.

The U-shaped stop has a U-shaped cross section designed such that the closed portion of the U-shaped stop is formed on the underside of the basic body or projects with respect to the underside of the basic body. Consequently, when the device is fastened to the mounting, the closed portion of the U-shaped stop can be introduced into a recess of the mounting. If a force is exerted in the push-on direction on the U-shaped stop via the optical fiber cable or the subassembly. The optical fiber cable or the subassembly is pushed onto the guide rail of the device. The device arches on its underside in such a way that anchoring elements are hooked up in the region of the recesses of the mounting, and, thereby, prevents the anchoring elements of the device from inadvertently or unintentionally coming loose from the recesses of the mounting.

In the region of the topside of the basic body, an elastically deformable stop, acting opposite to the push-on direction, for the subassembly is formed at a rear end of the basic body, as seen in the push-on direction of the subassembly.

Figure 1:
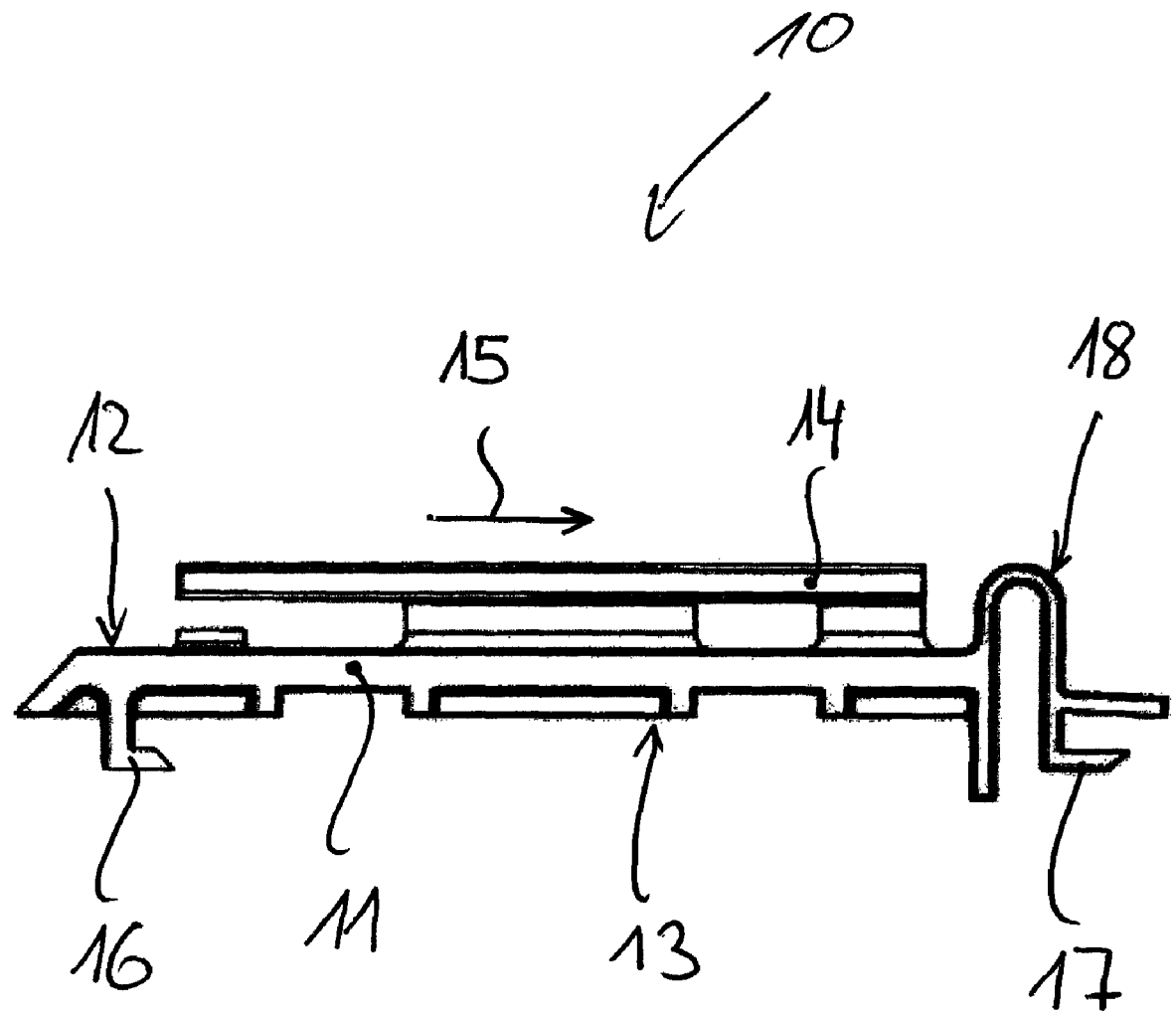
FIG. 1 is a side view of a device, known in the prior art, for receiving a subassembly assigned to an optical fiber cable and for fastening the subassembly received on the device to a mounting.
Figure 2:
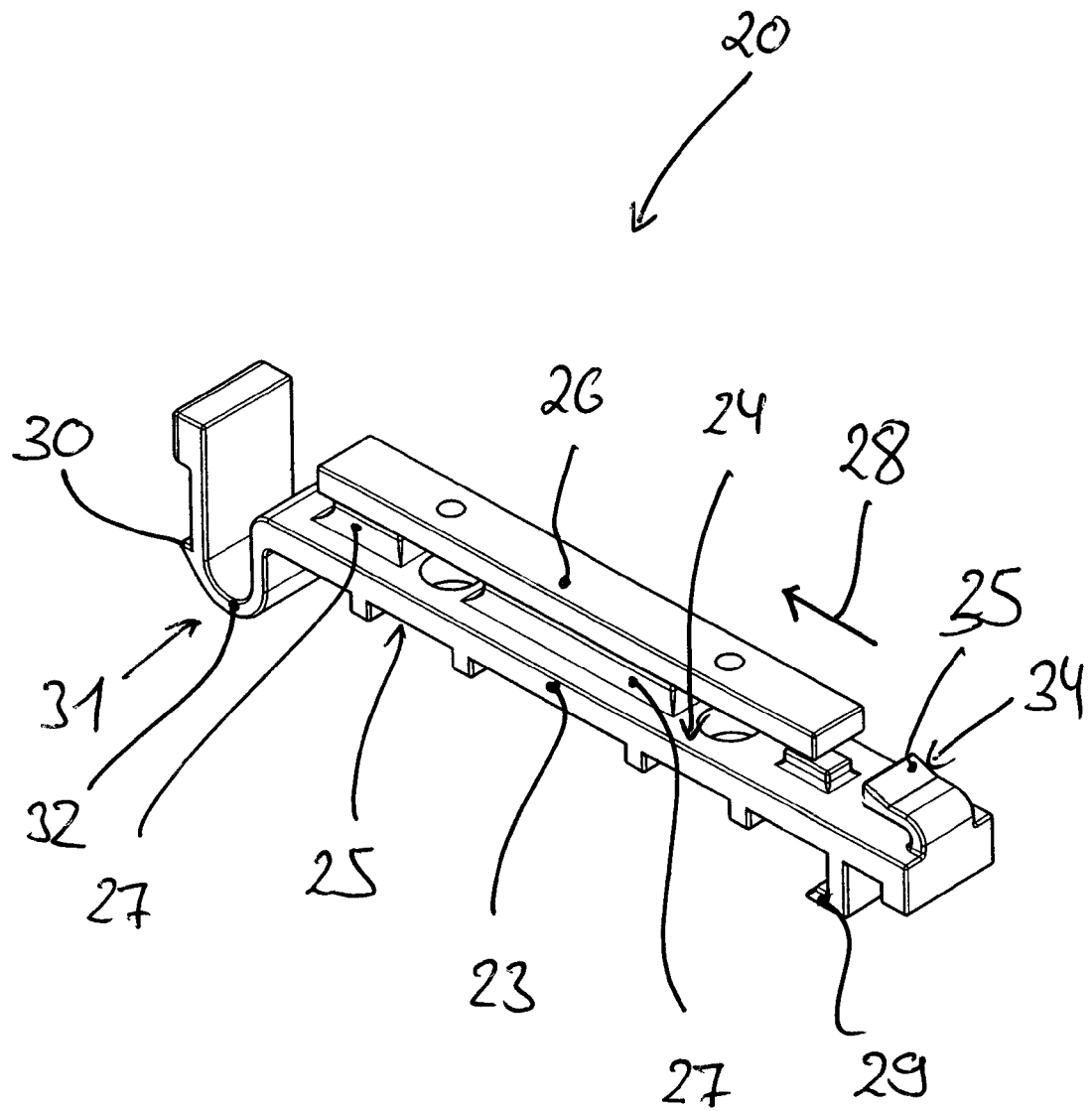
FIG. 2 is a perspective view of a device for receiving a subassembly assigned to an optical fiber cable and for fastening the subassembly received on the device to a mounting, according to an embodiment.
Figure 6:
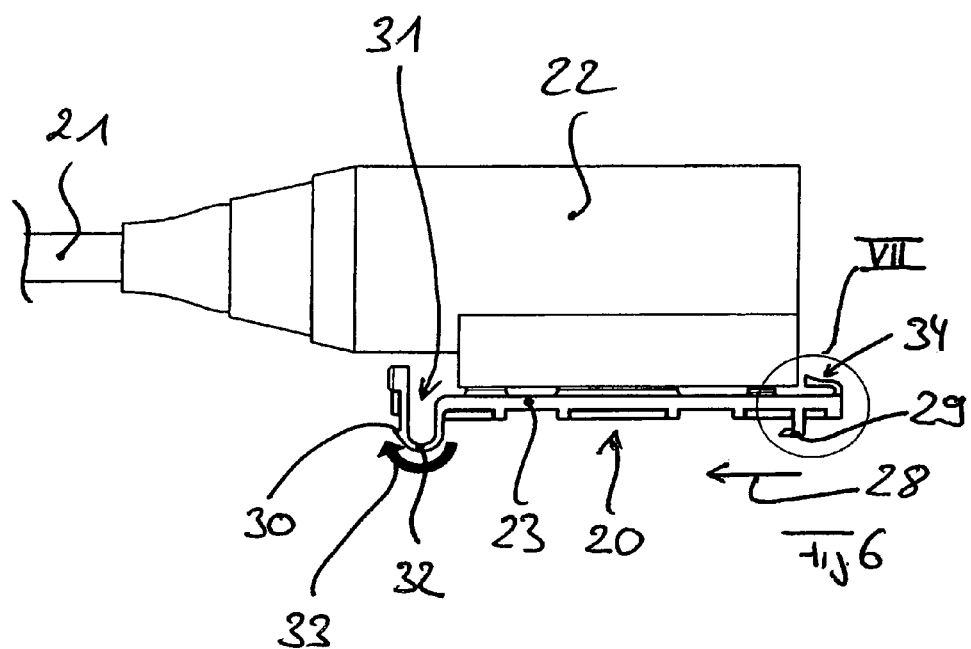
FIG. 6 is a side elevation of the device shown in FIG. 2 with an optical fiber cable and a subassembly which is assigned to the optical fiber cable received by the device, according to an embodiment.
Figures 7, 8:
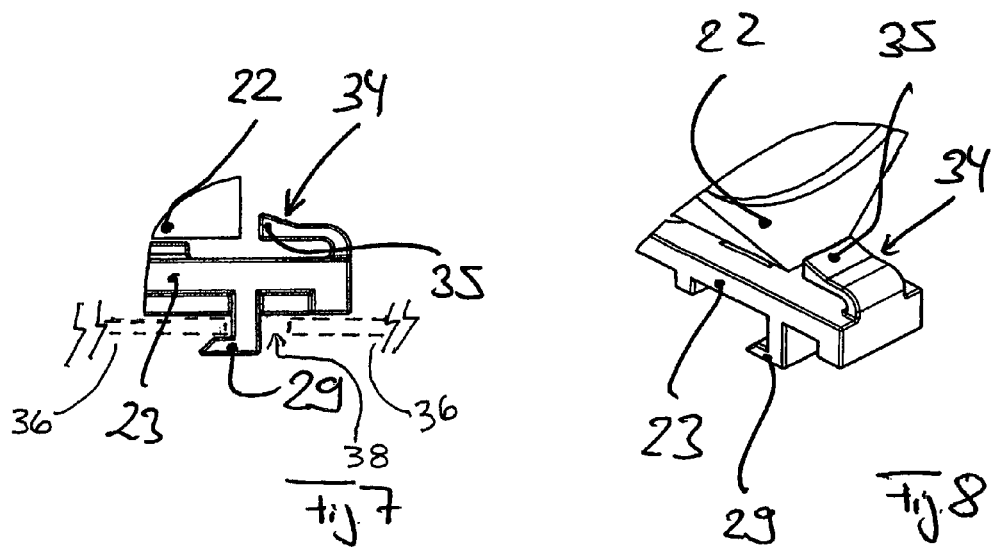
FIG. 7 is a detail view of detail VI of FIG. 6.
FIG. 8 is a perspective view of the detail shown in FIG. 7.

FIGS. 2 and 3 show different views of a device 20 for receiving a subassembly, such as, for example, a plug or a socket or a furcation adaptor, assigned to an optical fiber cable and for fastening the subassembly received on the device 20 to a mounting, such as, for example, a wall of a distribution panel or distribution cabinet, via the device 20. FIGS. 4 and 5 show details of the device 20. FIGS. 6 to 8 show the device 20 in each case together with a subassembly 22 which is assigned to an optical fiber cable 21 and which is received on the device 20, the subassembly 22 shown in FIGS. 6 to 8, which is assigned to the optical fiber cable 21 being a furcation adaptor.

The device 20 has a bar-shaped basic body 23 with a topside 24 and with an underside 25. On the topside 24 of the bar-shaped basic body 23, a guide rail 26 is formed, which extends approximately parallel to the bar-shaped basic body 23 and which is connected to the bar-shaped basic body 23 via portions 27.

The subassembly 22, shown in FIG. 6, which is assigned to the optical fiber cable 21, can be pushed onto the guide rail 26 in the direction of the arrow 28 shown in FIG. 2. For this purpose, the guide rail 26 engages into a groove, not illustrated in detail, which is formed on the subassembly 22. The arrow 28, therefore, indicates the direction in which the subassembly 22 assigned to the optical fiber cable 21 is pushed onto the guide rail 26 of the device 20 according to the embodiment.

At mutually opposite ends of the bar-shaped basic body 23, anchoring elements 29 and 30 are formed, via which the device 20 can be fastened to a mounting 36, in particular a wall of a distribution panel or distribution cabinet, specifically in such a way that, the anchoring elements 29, 30 can be introduced in a barb-like manner into recesses 37, 38 of the mounting 36 and, thus, project into the recesses 37, 38 of the mounting 36.

The anchoring element 30 positioned at the front end of the bar-shaped basic body 23, as seen in the push-on direction 28, is in this case formed as part of a stop 31 of U-shaped cross section, the stop 31 being effective, as seen in the push-on direction 28, as a stop for the subassembly 22 of the optical fiber cable 21.

The stop 31 of U-shaped cross section is designed in such a way that a closed portion 32 of the latter is formed on the underside 25 of the bar-shaped basic body 23 or projects with respect to the underside 25 of the bar-shaped basic body 23. By contrast, the stop 31 of U-shaped cross section is designed to be open in the region of the topside 24 of the bar-shaped basic body 23.

When the device 20, together with a subassembly 22 received on the latter and assigned to the optical fiber cable 21, is to be fastened to a mounting, the stop 31 of U-shaped cross section engages with the closed portion 32 into a recess of the mounting.

When a force is exerted on the stop 31 in the push-on direction 28 via the optical fiber cable 21 or via the subassembly 22 assigned to the optical fiber cable 21, the stop 31 of U-shaped cross section is subjected, according to FIG. 6, to a deformation in the direction of the arrow 33, with the result that the bar-shaped body 23 ultimately arches and the anchoring elements 29, 30 are clamped in the region of the recesses of the mountings.

There is no risk that the anchoring elements 29, 30 jump out of the recesses of the mountings inadvertently, and the device 20 comes loose from the mounting inadvertently.

In the region of the topside 24 of the bar-shaped basic body 23, an elastically deformable stop 34 acting opposite to the push-on direction 28 for the subassembly 22 assigned to the optical fiber cable 21 is formed at the rear end of the basic body 23, as seen in the push-on direction 28.

The stop 34 acting opposite to the push-on direction 28 can be elastically deformed or pressed in the direction of the topside 24 of the basic body 23 both in order to push the subassembly 22 assigned to the optical fiber cable 21 onto the guide rail 26 and in order to remove the same from the guide rail 26.

At the free end of the elastically deformable stop 34, the latter has a ramp-shaped projection 35, which, according to FIGS. 7 and 8, when the subassembly 22 is pushed onto the device 20, covers a contour of the subassembly 22 in regions, so that, when a force is exerted opposite to the push-on direction 28 on the optical fiber cable 21 or the subassembly 22, the subassembly 22 presses against the ramp-shaped projection 35 of the stop 34 and, thus, prevents the situation where the subassembly 22 can be inadvertently pushed off from the guide rail 26.

If the subassembly 22 is to be intentionally removed from the device 20, the ramp-shaped projection 35 of the stop 34 is suppressed in the direction of the topside 24, specifically in such a way that it is pressed under the contour of the subassembly 22 and therefore does not obstruct the removal of the subassembly 22 from the device 20. When the subassembly 22 is pushed onto the device 20 or the guide rail 26 of the latter, the ramp-shaped projection 35 of the stop 34 is likewise pressed under the contour of the subassembly 22, while, after the subassembly 22 has been pushed completely onto the device 20, the stop 34 returns automatically, and the ramp-like projection 35 then once again partially covers the contour of the subassembly 22.

The subassembly 22 can be attached to the device 10 and removed from the device 10 before and after the device 10 has been fastened to the mounting.

Many modifications and other embodiments of the invention set forth herein will come to mind to one skilled in the art to which the invention pertains having the benefit of the teachings presented in the foregoing descriptions and the associated drawings.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A device for receiving a fiber optic cable subassembly and fastening the fiber optic cable subassembly to a mounting, comprising:
   a body comprising a front end, a rear end, a topside, and an underside;
   a rear anchor formed on the underside at the rear end and adapted to be introduced in a recess of a mounting;
   a u-shaped stop formed on the underside at the front end, the u-shaped stop comprising a closed portion and a front anchor formed therein, and the u-shaped stop is adapted to be introduced in a recess of the mounting; and
   a guide rail formed on the topside and adapted to receive the fiber optic cable subassembly when the fiber optic cable subassembly is pushed onto the guide rail in a push-on direction; and
   an elastically deformable stop formed at the rear end,
   wherein the front anchor and the rear anchor are adapted to fasten a fiber optic cable subassembly received on the device to the mounting, and the u-shaped stop is adapted to deform resulting in the body arching and thereby clamping the front anchor and the rear anchor in the recesses of the mounting when the u-shaped stop is introduced in the recess of the mounting,
   wherein the push-on direction is from the rear end towards the front end, and
   wherein the elastically deformable stop is adapted to act opposite to the push-on direction for preventing the fiber optic cable subassembly from being inadvertently removed from the guide rail.

2. The device of claim 1, wherein the elastically deformable stop is adapted to be pressed in a direction of the topside when the fiber optic cable subassembly is pushed onto the guide rail.

3. The device of claim 1, wherein the elastically deformable stop is adapted to be pressed in a direction of the topside to remove the fiber optic cable subassembly from the guide rail.

4. The device of claim 1, wherein the elastically deformable stop comprises a ramp shaped projection,
   wherein the ramp shaped projection is adapted to be pressed under a contour of the fiber optic cable subassembly to not obstruct the fiber optic cable subassembly when the fiber optic cable subassembly is pushed onto the guide rail or removed from the guide rail, and
   the ramp shaped projection is adapted to automatically return to a position partially covering the contour of the fiber optic cable subassembly which is pushed onto the guide rail to prevent the fiber optic cable subassembly from being inadvertently removed from the guide rail.

5. A device for receiving a fiber optic cable subassembly and fastening the fiber optic cable subassembly to a mounting, comprising:
   a body comprising a front end, a rear end, a topside, and an underside;
   a rear anchor formed on the underside at the rear end and adapted to be introduced in a recess of a mounting; and
   a u-shaped stop formed on the underside at the front end, the u-shaped stop comprising a closed portion and a front anchor formed therein, and the u-shaped stop is adapted to be introduced in a recess of the mounting,
   wherein the front anchor and the rear anchor are adapted to fasten a fiber optic cable subassembly received on the device to the mounting, and the u-shaped stop is adapted to deform resulting in the body arching and thereby clamping the front anchor and the rear anchor in the recesses of the mounting when the u-shaped stop is introduced in the recess of the mounting, and
   the closed portion is configured to be introduced in one of the recesses of the mounting.

6. The device of claim 5, wherein the fiber optic cable subassembly is one of a plug, a socket and a furcation adapter.

7. The device of claim 5, further comprising: a guide rail; and a stop adapted to prevent the fiber optic cable subassembly from being inadvertently removed from the guide rail.

8. The device of claim 5, further comprising a guide rail formed on the topside and adapted to receive the fiber optic cable subassembly when the fiber optic cable subassembly is pushed onto the guide rail in a push-on direction,
   wherein the push-on direction is from the rear end towards the front end.

9. The device of claim 8, further comprising an elastically deformable stop formed at the rear end,
   wherein the elastically deformable stop is adapted to act opposite to the push-on direction for preventing the fiber optic cable subassembly from being inadvertently removed from the guide rail.

10. The device of claim 9, wherein the elastically deformable stop is adapted to be pressed in a direction of the topside when the fiber optic cable subassembly is pushed onto the guide rail.

11. The device of claim 9, wherein the elastically deformable stop is adapted to be pressed in a direction of the topside to remove the fiber optic cable subassembly from the guide rail.

12. The device of claim 9, wherein the elastically deformable stop comprises a ramp shaped projection,
    wherein the ramp shaped projection is adapted to be pressed under a contour of the fiber optic cable subassembly to not obstruct the fiber optic cable subassembly when the fiber optic cable subassembly is pushed onto the guide rail or removed from the guide rail, and
    the ramp shaped projection is adapted to automatically return to a position partially covering the contour of the fiber optic cable subassembly which is pushed onto the guide rail to prevent the fiber optic cable subassembly from being inadvertently removed from the guide rail.

13. A device for receiving a fiber optic cable subassembly and fastening the fiber optic cable subassembly to a mounting, comprising:
    a body comprising a front end, a rear end, a topside, and an underside;
    a rear anchor formed on the underside at the rear end and adapted to be introduced in a recess of a mounting; and
    a u-shaped stop formed on the underside at the front end, the u-shaped stop comprising a closed portion and a front anchor formed therein, and the closed portion is adapted to be introduced in a recess of the mounting,
    wherein the front anchor and the rear anchor are adapted to fasten a fiber optic cable subassembly received on the device to the mounting.

14. The device of claim 13, wherein the fiber optic cable subassembly is one of a plug, a socket and a furcation adapter.

15. The device of claim 13, further comprising:
    a guide rail; and a stop adapted to prevent the fiber optic cable subassembly from being inadvertently removed from the guide rail.

16. The device of claim 13, further comprising a guide rail formed on the topside and adapted to receive the fiber optic cable subassembly when the fiber optic cable subassembly is pushed onto the guide rail in a push-on direction, wherein the push-on direction is from the rear end towards the front end.

17. The device of claim 16, further comprising an elastically deformable stop formed at the rear end, wherein the elastically deformable stop is adapted to act opposite to the push-on direction for preventing the fiber optic cable subassembly from being inadvertently removed from the guide rail.

18. The device of claim 17, wherein the elastically deformable stop is adapted to be pressed in a direction of the topside when the fiber optic cable subassembly is pushed onto the guide rail.

19. The device of claim 17, wherein the elastically deformable stop is adapted to be pressed in a direction of the topside to remove the fiber optic cable subassembly from the guide rail.

20. The device of claim 17, wherein the elastically deformable stop comprises a ramp shaped projection,
  wherein the ramp shaped projection is adapted to be pressed under a contour of the fiber optic cable subassembly to not obstruct the fiber optic cable subassembly when the fiber optic cable subassembly is pushed onto the guide rail or removed from the guide rail, and
  the ramp shaped projection is adapted to automatically return to a position partially covering the contour of the fiber optic cable subassembly which is pushed onto the guide rail to prevent the fiber optic cable subassembly from being inadvertently removed from the guide rail.

* * * * *